United States Patent Office 3,376,326
Patented Apr. 2, 1968

3,376,326
INTERESTERIFICATION OF GLYCERIDES
Neil R. Artman, Wyoming, Raymond M. Cartier, Springfield Township, Hamilton County, and David D. Whyte, Wyoming, Ohio, assignors to The Procter & Gamble Company, Cincinnati, Ohio, a corporation of Ohio
No Drawing. Filed Dec. 31, 1964, Ser. No. 422,499
9 Claims. (Cl. 260—410.7)

ABSTRACT OF THE DISCLOSURE

A process for simultaneously interesterifying and selectively separating triglyceride oils high in combined linolenic acid by (1) contacting a triglyceride oil in a contact zone with a flowing stream of solvent selected from the group dimethylformamide, dimethylcyanamide, and 3,3 - dimethylaminopropionitrile with a countercurrent flowing stream of solvent selected from the group pentane, hexane, heptane and octane, there being introduced into said contact zone an interesterification catalyst selected from the group sodium and potassium methyl sulfinyl carbanion, and sodium and potassium t-butoxide; and (2) separating the two solvent phases.

---

This invention relates to an extractive interesterification process whereby triglyceride oil is contacted by countercurrently-flowing streams of selective solvents while in the presence of an interesterification catalyst. More particularly, the invention relates to a continuous method for simultaneously rearranging fatty acid radicals in mixed fatty esters, said fatty acid radicals differing in degree of unsaturation, and selectively separating the esters into a fraction containing a preponderance of the more unsaturated radicals and a fraction containing a preponderance of the less unsaturated fatty acid radicals. More specifically, the invention relates to a continuous method for treatment of oils containing combined linoleic and linolenic acids to produce a glyceride fraction in which the content of combined linolenic acid is substantially reduced and a glyceride fraction in which the content of combined linolenic acid is substantially increased.

Soybean oil is widely used for edible purposes, as, for example, a clear oil in salad dressings. However, untreated soybean oil has a characteristic bean-like odor and flavor which is objectionable to many users. Although this characteristic can be removed by high temperature steam deodorization, it may redevelop after a period of time. The undesirable flavor and odor are believed to be due to a form of oxidation of combined linolenic acid in the oil, and, thus, it is highly desirable to reduce the content of this combined acid in soybean oil to effect stability against the development of the objectionable odor and flavor. Other oils containing large amounts of linolenic acid, such as fish oils, present similar problems.

On the other hand, the presence of combined linolenic acid is highly desirable in so-called "drying oils" which are used in the manufacture of paints and varnishes. Some oils, such as soybean oil and fish oil, which contain substantial amounts of combined linolenic acid, also contain large amounts of combined fatty acids having a higher degree of saturation which are not desirable in drying oils. These can be treated by a fractionation process, usually involving several stages of fractionation, to remove the less saturated combined acids in order to make drying oils. Such a process of removal is imperfect, produces relatively low yields, and is also time-consuming and expensive.

It is therefore an object of this invention to provide an improved continuous method for efficiently and more completely separating esters of a mixture of fatty acids into fractions substantially differing in degree of unsaturation.

It is a further object of this invention to provide a method for treating soybean oil whereby the resulting product is free from a tendency to develop undesirable odors and flavors.

It is another object to provide a triglyceride oil high in combined linolenic acid.

Other objects and advantageous features will be apparent from the following detailed description and claims.

In general, the invention, in its most practical aspect, involves a process for simultaneously effecting interesterification in a triglyceride oil which initially contains both combined linolenic and linoleic acid radicals, and selectively extracting the interesterified glycerides so as to separate out oil containing a major amount of the linolenic acid radicals of the said triglyceride oil, said process comprising the steps:

(1) Introducing said triglyceride oil into a contact zone;

(2) Flowing through said contact zone a stream of a first selective solvent for triglyceride oil selected from the group consisting of dimethylformamide, dimethyl cyanamide, and 3,3-dimethylaminopropionitrile and mixtures thereof;

(3) Flowing through said contact zone a stream of a second selective solvent for triglyceride oil in a direction countercurrent to said stream of first solvent, said second solvent being selected from the group consisting of pentane, hexane, heptane, octane, isomers of these, and mixtures thereof;

(4) Introducing into said contact zone an interesterification catalyst in an amount sufficient to effect interesterification of said triglyceride oil, whereby the said first solvent selectively dissolves triglycerides containing a preponderance of the linolenic acid radicals initially present in said triglyceride oil, and the said second solvent selectively dissolves triglycerides containing a preponderance of more saturated fatty acid radicals present in said triglyceride oil; and (5) Separating the two solvent phases from contact with each other by any conventional means.

Thus, according to the process of this invention, triglyceride oils can be efficiently separated into two parts, one part richer in combined linolenic acid as compared with the original oil, and the other part substantially lower in combined linolenic acid as compared with the original oil, than can be produced by a conventional fractionation process wherein the initial oil is cooled and the crystals which form are separated from the remaining oil.

Oils especially suitable for use in the process of this invention are those containing appreciable amounts of linolenic acid and include soybean oil, linseed oil, perilla oil, hempseed oil, and fish oils such as whale, sardine, herring, and pilchard oils. It is desirable to remove phosphatides and other mucilaginous materials from these oils by water washing the oil in any conventional manner prior to treatment by the process of this invention. These materials may also be removed by alkali refining since it is also desired to remove free fatty acid present in the oils. The oils additionally may be bleached by means of a bleaching earth.

The two groups of selective solvents used in this process are partially miscible solvents which effectively distribute the triglyceride oil according to degree of unsaturation. The first selective solvent is chosen to selectively dissolve the triglycerides containing a preponderance of the more unsaturated fatty acid radicals, e.g. the linolenic acid radicals, and is selected from the group consisting of dimethylformamide, dimethyl cyanamide, 3,3-dimethylaminopropionitrile and mixtures thereof. The second selective solvent, which selectively dissolves the triglycerides containing a preponderance of the more saturated fatty acid radicals, e.g., the linoleic acid radicals, is chosen from the group consisting of pentane, hexane, heptane, octane, isomers of these and mixtures thereof.

Interesterification catalysts suitable for use in this process must promote intermolecular rearrangement, or interesterification, of the triglycerides and must not be inactivated by the solvents used. They must be sufficiently active to allow the use of reasonable oil and solvent flow rates and process equipment of reasonable size. Catalysts which have been found to be particularly suitable are sodium and potassium tertiary butoxides and sodium and potassium methyl sulfinyl carbanions. The carbanion catalyst, which is exceptionally efficient in the process of this invention, is formed by combining dimethyl sulfoxide with a sodium or potassium interesterification catalyst, such as sodium or potassium hydrides. For example, sodium methyl sulfinyl carbanion (SMSC) can be prepared from dimethyl sulfoxide and sodium hydride as follows:

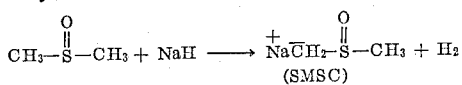

While applicant does not wish to be bound by any particular theoretical reaction mechanism, the particular adaptability of these catalysts to the present process may possibly be explained by the catalytic mechanism. While the exact mechanism is not known, it is believed that these catalytic compounds readily react with the triglycerides to form alkali metal diglycerates and either keto sulfoxides (in the case of the carbanion catalysts) or tertiary butyl esters (in the case of the butoxide catalysts), which act as intermediates in the interesterifica process. Thus, with SMSC catalyst, the reaction is believed to be:

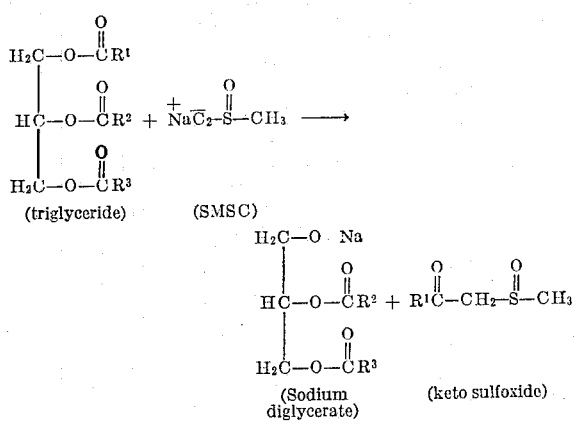

where $R^1$, $R^2$ and $R^3$ are the hydrocarbon chains of the fatty acyl radicals of the triglyceride molecule. As a result of the above reaction, the fatty radical attached to the sulfoxide molecule is free to migrate and react with a different diglycerate molecule, thus accomplishing the interesterification and regenerating the catalyst. Analogous reactions may be proposed when potassium methyl sulfinyl carbanion or sodium or potassium tertiary butoxide are substituted for SMSC.

Apparatus suitable for use in practicing the process of this invention should provide means for producing a countercurrent flow of the two selective solvents through a contact zone in which triglyceride oil is present together with the interesterification catalyst. Due to the substantially increased oil separation which is obtained in this process by the use of multistage processing, it is desirable to perform the interesterification and separation in a multistage operation. It is preferred to use a multistage extraction column in which the first selective solvent enters at one end and the second selective solvent at the other end. In this preferred apparatus a mixture of triglyceride oil and interesterification catalyst is fed into the column at a point between the ends. Alternatively, the catalyst can be combined with the first selective solvent.

An optional apparatus for practicing the process of this invention would be a series of mixers and settling tanks, so disposed as to be used for stepwise simultaneous rearrangement and countercurrent extractions.

The amount of first selective solvent used in the process of this invention can range from about 2 to 25 parts by volume, per unit time, per part of triglyceride oil. The amount of second selective solvent can vary from about 1 to 8 parts by volume, per unit time, per part of triglyceride oil. However, the optimum solvent ratios will depend upon the column design and the number of stages and the materials to be treated by the process.

The amount of interesterification catalyst should be sufficient to promote effective rearrangement of the triglyceride oil. From 0.05% to 10.0%, by weight of the oil, can be used, but preferred amounts are from 2% to 7%.

The presence of water in the system is detrimental to the process. First of all, it reacts with and destroys the usefulness of the catalyst for this process. Secondly, one of the products of the reaction of catalyst with water is an alkali hydroxide which, in turn, can saponify a portion of the fatty material present. These soaps tend to clog the processing equipment, necessitating frequent stoppage of the operation for cleaning purposes. For these reasons, the total water content of the system at all times is preferably controlled so as not to exceed 0.1% by weight of the total oil-solvent-catalyst system.

The following examples illustrate the use of this invention in the reduction of the combined linolenic acid content of triglyceride oils, but it is understood that they are not to be construed as limiting the scope of this invention.

EXAMPLE I

The process of the invention was performed in a thirty-seven stage counter-current glass column, similar to that illustrated in Chemical Engineering Progress, vol. 44, No. 9, September 1948, page 682. The column was eight feet in height and one inch in diameter. Provision was made for introduction of the second selective solvent near the bottom of the column and withdrawal near the top. Also provision was made for introduction of the first selective solvent near the top and withdrawal near the bottom. In the conventional way the introduction of the second selective solvent near the bottom of the column was effected at a point above the point of withdrawal of the first selective solvent with extract. Also the introduction of the first selective solvent near the top of the column was effected at a point below the point of withdrawal of the second selective solvent with extract. The feed point for triglyceride oil was at the fifteenth stage from the bottom of the column.

Sodium methyl sulfinyl carbanion (SMSC) catalyst was prepared by warming 100 ml. of pre-dried dimethyl sulfoxide (.007% water) in a three-necked flask to a temperature of 50° C. Continuous stirring was provided and the flask was vented to an oil trap. 4.4 gm. of sodium hydride were added and the mixture was maintained at 50° C. for two hours to insure complete reaction. The product was a non-viscous, grey material with a pungent odor. The catalyst was then added to 1500 ml. of dimethylformamide (first selective solvent) which had been pre-dried by the use of molecular sieves (.02% water) and saturated with hexane.

Three pints (1.42 liters) of soybean oil were dried by azeotropic distillation with benzene. The oil was then cooled under nitrogen, and 4 gm. of sodium, dispersed in 10.5 ml. hexane, were added to the oil, which was then allowed to stand for about three days to further dry the oil.

Hexane (second selective solvent) for use in the run was dried by letting it stand over sodium ribbons for three days.

The extraction column was filled to within six inches of the top with the mixture of dimethylformamide and catalyst. Hexane was fed into the bottom of the column until small globules were seen going up the column.

During the continuous operation soybean oil was introduced into the column at the fifteenth stage from the bottom, dimethylformamide and catalyst at the top, and hexane at the bottom, the respective solvents acting selectively on the oil to form two solutions of triglyceride while interesterification took place. The temperature remained constant at 31° C. and the average flowrates were as follows:

|  | Ml./min. |
|---|---|
| Dimethylformamide and catalyst | 4.0 |
| Hexane | 1.4 |
| Soybean oil | 0.8 |

A first selective solvent phase, which contained an increased percentage of the more unsaturated combined acid radicals, was removed from the bottom of the column; a second selective solvent phase was removed from the top and drained into a still. There, the pressure was reduced to 5 mm. Hg and the temperature maintained at 65° C. until all of the hexane had been removed. The remaining oil-catalyst mixture was then washed with water to remove all catalyst. (The triglyceride oil derived from the second selective solvent phase after being processed and purified as described above shall hereafter be called "treated oil.") Samples of the original oil and of the treated oil were taken and the combined acid content of each was measured by ultraviolet spectrophotometry. The amounts of combined linoleic and linolenic acid were as follows:

|  | Linoleic Acid (percent) | Linolenic Acid (percent) |
|---|---|---|
| Original oil | 49.04 | 7.61 |
| Treated oil | 20.95 | 0.27 |

It is evident from these analyses that the hexane extract (treated oil) was appreciably lower in combined linolenic acid content. Substantially all of the balance was composed of palmitic, stearic and oleic acids. The oil showed no tendency to develop a bean-like odor and flavor. The oil separated from the dimethylformamide solvent, was correspondingly higher than the original oil in combined linolenic acid and was suitable as a source of drying oil.

Comparable separations are achieved when potassium methyl sulfinyl carbanion, potassium tertiary butoxide, sodium tertiary butoxide, or mixtures thereof is substituted in whole or in part for the sodium methyl sulfinyl carbanion, or when the catalyst is added with the soybean oil.

EXAMPLE II

The extractive interesterification of this example was performed in a rotating disc column. This comprised a glass column eight feet high and having an inside diameter of one inch. Inlets and outlets were provided substantially as described in Example I. On a stainless steel shaft, extending lengthwise through the center of the column, were mounted stainless steel discs perpendicular to the axis of the column. These discs had a diameter of 5/8-inch and were 1/16-inch thick. There were sixty-two discs distributed throughout the column. Extending into the column from the inside wall were Teflon stator rings which formed an inside diameter of 11/16-inch. The rings were spaced alternately between the discs along the length of the column and at each end so as to form sixty-two compartments, 1 1/8" high, spaced along the axis of the column and each enclosing a disc. The discs were rotated by a stirring mechanism connected to one end of the shaft on which the discs were mounted.

The solvents chosen for this run were heptane and dimethylformamide. SMSC catalyst was prepared and the soybean oil and solvents were dried in the same manner as described in Example I, above. The catalyst was added to a quantity of soybean oil sufficient to give an equivalent sodium in oil concentration of 1.3% by weight. One part by volume of the oil plus catalyst was then mixed with 3.3 parts by volume heptane to form the feed composition.

The rotating disc column was filled with dimethylformamide to within six inches of the top and heptane fed into the bottom of the column until small globules were seen going up the column. The dimethylformamide stream was then introduced at the top of the column, heptane at the bottom, and the feed composition slowly added at the fifteenth stage from the bottom. The volume ratio of dimethylformamide to oil was adjusted to 11.7 to 1, and that of heptane (exclusive of heptane in the feed composition) to oil adjusted to 1.9 to 1. The average residence time of the oil at equilibrium was twenty-one minutes. Throughout the run, the temperature remained at 31° C. and the rotor speed was maintained at 620 r.p.m. The agitation effected turbulence and intimate contact of the phases but was not sufficiently violent to interfere with the overall countercurrent passage of the two selective solvents with extracts. Removal of the first and second selective solvent phases was as described in Example I, above. The catalyst and solvent were removed from the second selective solvent phase as described in Example I, and the treated oil was analyzed for combined linolenic and linoleic acids for comparison with the composition of the original oil. The results were as follows:

|  | Linoleic (percent) | Linolenic (percent) |
|---|---|---|
| Original Oil | 48.0 | 6.8 |
| Treated Oil | 47.0 | 3.0 |

Substantially all of the balance was composed of palmitic, stearic and oleic acids. The hexane extract (treated oil) showed no tendency to develop an undesirable odor or flavor.

When in the above example, dimethylformamide is replaced in whole or in part by dimethyl cyanamide, 3,3-dimethylaminopropionitrile or mixture thereof, comparable separations are achieved. Likewise, when in the above example, heptane is replaced in whole or in part by hexane, pentane, octane, isomers of these, isoheptane or mixtures of any of the above, comparable separations are achieved.

In order to further reduce the amount of combined linolenic acid present in the treated oil, one or more additional extractive interesterification processes according to this invention can be conducted. Additional care should be taken to prevent the accumulation of water between the two or more steps. It is generally desirable to add additional catalyst prior to each succeeding step to replace that which was lost through the first selective solvent phase and due to the presence of water in the system during the earlier process or processes. The second selective solvent phase which exits from a given extractive esterification process can be used as such as the feed composition for the next; alternatively, a portion of the second selective solvent can be removed by distillation if it is desired that the total second selective solvent to oil ratio not be substantially higher than that which existed in the preceding step. The following examples illustrate the use of two-pass extractive interesterification processing.

EXAMPLE III

The solvents, catalyst and initial operating procedures were the same as in Example II, above. SMSC catalyst was added to sufficient soybean oil to give an equivalent sodium in oil concentration of 1.4% by weight. One part of the oil was added to two parts heptane to form the feed composition. During the first pass, the dimethylformamide to oil volume ratio was 8.0:1, and the heptane (exclusive of that in the feed composition) to oil volume ratio 3.7:1. The average equilibrium residence time of the oil during the first pass was 8.4 minutes. The temperature remained constant at 31° C. and the rotor speed was maintained at 630 r.p.m. The second selective solvent phase was drained into a still, the pressure reduced to 5 mm. Hg, and the temperature increased to 65° C. Sufficient heptane was removed to return the composition of the mixture to that of the original feed composition (heptane to oil ratio of 2:1 by volume). Between the two passes, the oil-heptane-catalyst mixture was stored in a nitrogen atmosphere to prevent the accumulation of moisture. Immediately prior to starting the second pass, additional SMSC catalyst was added to return the sodium in oil concentration to 1.4% by weight. The oil mixture was then slowly introduced at the fifteenth stage from the bottom of the column. The respective solvent to oil ratios, temperature and rotor speed were the same as in the first pass. The average residence time of the oil in the second pass was 12.6 minutes. The second selective solvent phase from this second pass was treated as described in Example I, above, to separate the oil from the solvent and catalyst. This treated oil and the original oil were analyzed for combined linoleic and linolenic acid content. The results were as follows:

|  | Linoleic Acid (percent) | Linolenic Acid (percent) |
|---|---|---|
| Original Oil | 48.0 | 6.8 |
| Treated Oil | 47.8 | 2.6 |

Substantially all of the balance was composed of palmitic, stearic and oleic acids. As in preceding examples, the treated oil showed no tendency to develop an off flavor odor.

EXAMPLE IV

In another two pass run, potassium tertiary butoxide (KTB) was substituted for the SMSC catalyst. KTB was prepared in the following manner. 500 ml. of tertiary butyl alcohol were placed in a three-neck flask equipped with a reflux condenser and stirrer. 38.5 gm. of metallic potassium were weighed into a beaker containing toluene, and then added in small amount to the alcohol. Air was blown across the outside of the flask to keep the temperature of the solution below about 60° C. The stirring was continued until all the potassium had reacted and the temperature receded. The catalyst was then added to sufficient soybean oil to give an equivalent potassium in oil concentration of 1.6% by weight. One part of this mixture was then added to two parts heptane to form the feed composition.

The extractive interesterification was then carried out with the same procedures as in Example III. In both passes the dimethylformamide to oil volume ratio was 2.8 to 1 and the heptane (exclusive of that in the feed composition) to oil volume ratio was 3.2 to 1. The feed composition for the second pass was made by distilling sufficient heptane from the second selective solvent phase from the first pass to yield a heptane to oil ratio of about 2:1, substantially the same as the original feed composition. Sufficient KTB was added immediately prior to the starting of the second pass to return the potassium in oil concentration to 1.6% by weight. The respective average oil residence times for the two passes were 10.9 and 8.8 minutes. The temperature remained at 88° F. and the rotor speed at 650 r.p.m. for both passes. The product oil was treated as previously described, analyzed for combined acid content, and compared with the original oil. The results were:

|  | Linoleic Acid (percent) | Linolenic Acid (percent) |
|---|---|---|
| Original Oil | 48.0 | 6.8 |
| Treated Oil | 40.0 | 2.6 |

Substantially all of the balance was composed of palmitic, stearic and oleic acids. The treated oil was more resistant to the development of off flavor and odor than the original oil.

What is claimed is:

1. The continuous process for simultaneously effecting interesterification in a triglyceride oil which initially contains both combined linolenic and linoleic acid radicals, and selectively extracting the interesterified glycerides so as to separate out oil containing a major amount of the linolenic acid radicals of said triglyceride oil, said process comprising the steps:
   (1) introducing said triglyceride oil into a contact zone;
   (2) flowing through said contact zone a stream of a first selective solvent selected from the group consisting of dimethylformamide, dimethyl cyanamide, 3,3-dimethylaminopropionitrile and mixtures thereof;
   (3) flowing through said contact zone a stream of a second selective solvent in a direction countercurrent to said stream of first solvent, said second solvent being selected from the group consisting of pentane, hexane, heptane, octane, isomers of these, and mixtures thereof;
   (4) introducing into said contact zone an interesterification catalyst selected from the group consisting of sodium methyl sulfinyl carbanion, potassium methyl sulfinyl carbanion, sodium tertiary butoxide, potassium tertiary butoxide and mixtures thereof, in an amount sufficient to effect interesterification of said triglyceride oil, whereby the said first selective solvent selectively dissolves triglycerides which contain a preponderance of the linolenic acid radicals, and the said second selective solvent selectively dissolves triglycerides containing a preponderance of more saturated fatty acid radicals; and
   (5) separating the two solvent phases from contact with each other.

2. The method according to claim 1 wherein the interesterification catalyst is mixed with the triglyceride oil.

3. The method according to claim 1 wherein the amount of said first solvent is from about 2 to 25 parts by volume per unit time, per part of triglyceride oil; the amount of said second solvent is from about 1 to 8 parts by volume per unit time, per part of triglyceride oil; and the amount of catalyst is from about 0.05 to 10.0% by weight of said triglyceride oil.

4. The method according to claim 1 wherein the first solvent is dimethylformamide.

5. The method according to claim 1 wherein the second solvent is heptane.

6. The method according to claim 1 wherein the catalyst is sodium methyl sulfinyl carbanion.

7. The method according to claim 1 wherein solvent and catalyst are removed from each solvent phase.

8. The continuous process for simultaneously effecting interesterification in a triglyceride oil which initially contains both combined linolenic and linoleic acid radicals, and selectively extracting the interesterified glycerides so as to separate out oil containing a major amount of the linolenic acid radicals of said triglyceride oil, said process comprising the steps:
   (1) introducing said triglyceride oil into a contact zone;
   (2) flowing through said contact zone a stream of a first selective solvent selected from the group consisting of dimethylformamide, dimethyl cyanamide, 3,3-dimethylaminopropionitrile and mixtures thereof;

(3) flowing through said contact zone a stream of a second selective solvent in a direction countercurrent to said stream of first solvent, said second solvent being selected from the group consisting of pentane, hexane, heptane, octane, isomers of these, and mixtures thereof;

(4) introducing into said contact zone an interesterification catalyst selected from the group consisting of sodium methyl sulfinyl carbanion, potassium methyl sulfinyl carbanion, sodium tertiary butoxide, potassium tertiary butoxide and mixtures thereof, in an amount sufficient to effect interesterification of said triglyceride oil, whereby the said first selective solvent selectively dissolves triglycerides which contain a preponderance of the linolenic acid radicals, and the said second selective solvent selectively dissolves triglycerides containing a preponderance of more saturated fatty acid radicals;

(5) separating the two solvent phases from contact with each other; and (6) taking the second selective solvent phase of Step 4, above, after the separation of Step 5, above, and reprocessing it according to Steps 1 thru 5, above, to separate out additional oil containing a high percentage of linolenic acid radicals.

9. In the separation of a triglyceride mixture containing fatty components of different degrees of unsaturation into a more unsaturated triglyceride fraction and a less unsaturated triglyceride fraction, the improvement which comprises, (1) continuously and simultaneously subjecting to interesterification in the presence of a catalyst selected from the group consisting of sodium methyl sulfinyl carbanion, potassium methyl sulfinyl carbanion, sodium tertiary butoxide, potassium tertiary butoxide and mixtures thereof, two flowing streams of triglyceride oil dissolved in two partially miscible solvents, one of such solutions consisting predominantly of triglyceride oil in a first selective solvent selected from the group consisting of dimethyl formamide, dimethyl cyanamide, 3,3-dimethylaminopropionitrile and mixtures thereof, the other such solution consisting predominantly of triglyceride oil in a second selective solvent different in specific gravity from the first selective solvent and selected from the group consisting of pentane, hexane, heptane, octane, isomers of these, and mixtures thereof;

(2) continuously subjecting said solutions to intimate contact one with the other to permit the first selective solvent to extract a preponderance of the more unsaturated triglycerides, both those initially present in the original oil and those formed progressively by interesterisfication, and permitting the other solvent to simultaneously extract the less unsaturated triglycerides, including both those initially present and those formed progressively by interesterification;

(3) continuously separating by gravity the two liquid phases from contact with one another and, (4) recovering from each phase its triglyceride solute.

References Cited

UNITED STATES PATENTS

| | | | |
|---|---|---|---|
| 2,291,461 | 7/1942 | Freeman | 260—428.5 |
| 2,573,900 | 11/1951 | Freeman | 260—428.5 |
| 2,688,626 | 9/1954 | Miller | 260—410.7 |

HENRY R. JILES, *Primary Examiner.*